United States Patent [19]

Kim et al.

[11] Patent Number: 5,552,829
[45] Date of Patent: Sep. 3, 1996

[54] IMAGE SIGNAL CODING SYSTEM

[75] Inventors: Kye J. Kim, Kyounggi-do; Tae Y. Chung, Seoul, both of Rep. of Korea

[73] Assignee: Samsung Electronics Co., Ltd., Rep. of Korea

[21] Appl. No.: 24,201

[22] Filed: Feb. 26, 1993

[30] Foreign Application Priority Data

Feb. 28, 1992 [KR] Rep. of Korea .................. 92-3169
Jan. 30, 1993 [KR] Rep. of Korea .................. 93-1212

[51] Int. Cl.$^6$ ........................... H04N 7/26; H04N 7/30
[52] U.S. Cl. ................ 348/392; 348/392; 348/395; 348/397; 348/405; 348/420; 348/421
[58] Field of Search ........................... 348/392, 395, 348/400, 403, 404, 405, 420, 421, 396, 397, 398, 416, 419, 412, 409, 404, 405

[56] References Cited

U.S. PATENT DOCUMENTS

| | | | |
|---|---|---|---|
| 4,831,440 | 5/1989 | Borgers et al. | 348/395 |
| 4,887,156 | 12/1989 | Ohki | 348/395 |
| 4,908,862 | 3/1990 | Kaneko et al. | 348/405 |
| 4,972,260 | 11/1990 | Fujikawa et al. | 348/400 |
| 5,001,559 | 3/1991 | Gonzales et al. | 348/400 |
| 5,045,938 | 9/1991 | Sugiyama | 348/405 |
| 5,063,608 | 11/1991 | Siegel | 348/395 |
| 5,079,630 | 1/1992 | Golin et al. | 348/398 |
| 5,109,451 | 4/1992 | Aono et al. | 348/397 |
| 5,121,216 | 6/1992 | Chen et al. | 348/404 |
| 5,157,488 | 10/1992 | Pennebreaker | 348/400 |
| 5,189,526 | 2/1993 | Sasson | 348/397 |
| 5,196,933 | 3/1993 | Henot | 348/397 |
| 5,216,712 | 6/1993 | Shimoda | 348/404 |
| 5,235,420 | 8/1993 | Charavi | 348/395 |
| 5,237,424 | 8/1993 | Nishino et al. | 358/340 |
| 5,245,427 | 9/1993 | Kunihiro | 348/400 |
| 5,294,974 | 3/1994 | Naimpally et al. | 348/395 |
| 5,355,167 | 10/1994 | Juri | 348/398 |

*Primary Examiner*—Thai Q. Tran
*Assistant Examiner*—Anand S. Rao
*Attorney, Agent, or Firm*—Weingram & Zall

[57] ABSTRACT

An image signal coding system encodes analog image signals into digital signals in a high-definition digital video tape recorder (D-VTR). A scrambling portion rearranges the image data of a frame formated in the order of vertical subsampling line into a predetermined unit of blocks to distribute the highly variable portions and substantially linear portions in the image data uniformly, while an activity calculation portion calculates a horizontal projection sum and a vertical projection sum of discrete coding transform factors in a unit block and a block activity, respectively to determine a coding area and a quantization step size. An adaptive scanning portion adaptively scans the quantized data in accordance with the coding area determined by the activity calculation portion and a sequential transmission portion sequentially transmits the data coded by a variable length coding in conforming with a predetermined transmitting bit rate in a unit of a fixed length, wherein a block having an underflow produced therein is added with 0 and transferred, while a block having an overflow produced therein is transmitted with only an amount of data coincided with the transfer bit rate.

6 Claims, 7 Drawing Sheets

720 PELS (Y)

120 LINE
120 LINE
120 LINE
120 LINE

| 1 | 13 | 25 | ... | 2 | 14 | 26 | ... |
| 3 | 15 | 27 | ... | 4 | 16 | 28 | ... |
| 5 | 17 | 29 | ... | 6 | 18 | 30 | ... |
| 7 | 19 | 31 | ... | 8 | 20 | 32 | ... |

360 PELS

| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |

|←—— 1ST FIXED LENGTH ——→|←—— 2ND FIXED LENGTH ——→|

| 25 | 26 | 27 | 28 | 29 | 30 | 31 | 32 | 33 | 34 | 35 | 36 | ... |

|←—— 3RD FIXED LENGTH ——→|

FIG. 4

| b11 | b12 | b13 | b14 | b15 | b16 | b17 | b18 |
| b21 | b22 | b23 | b24 | b25 | b26 | b27 | b28 |
| b31 | b32 | b33 | b34 | b35 | b36 | b37 | b38 |
| b41 | b42 | b43 | b44 | b45 | b46 | b47 | b48 |
| b51 | b52 | b53 | b54 | b55 | b56 | b57 | b58 |
| b61 | b62 | b63 | b64 | b65 | b66 | b67 | b68 |
| b71 | b72 | b73 | b74 | b75 | b76 | b77 | b78 |
| b81 | b82 | b83 | b84 | b85 | b86 | b87 | b88 |

SCANNING ORDER

|   | 1 | 2 | 3 | 4 | 5 | 6 | 7 | 8 |   |
|---|---|---|---|---|---|---|---|---|---|
| 1 | 1 | 3 | 5 | 11 | 16 | 25 | 39 | 57 | 1 |
| 2 | 2 | 5 | 9 | 14 | 23 | 33 | 44 | 58 | 2 |
| 3 | 4 | 8 | 12 | 19 | 29 | 36 | 48 | 59 | 3 |
| 4 | 7 | 10 | 15 | 21 | 34 | 37 | 55 | 60 | 4 |
| 5 | 13 | 17 | 22 | 33 | 46 | 51 | 56 | 62 | 5 |
| 6 | 18 | 20 | 24 | 28 | 43 | 49 | 53 | 63 | 6 |
| 7 | 26 | 27 | 32 | 41 | 45 | 50 | 54 | 61 | 7 |
| 8 | 30 | 31 | 38 | 40 | 42 | 47 | 52 | 64 | 8 |

FIG. 12B

|   | 1 | 2 | 3 | 4 | 5 | 6 | 7 | 8 |   |
|---|---|---|---|---|---|---|---|---|---|
| 1 | 1 | 3 | 5 | 11 | 15 |   |   |   | 1 |
| 2 | 2 | 5 | 9 | 13 | 18 |   |   |   | 2 |
| 3 | 4 | 8 | 12 | 16 | 19 |   |   |   | 3 |
| 4 | 7 | 10 | 14 | 17 | 20 |   |   |   | 4 |
| 5 |   |   |   |   |   |   |   |   | 5 |
| 6 |   |   |   |   |   |   |   |   | 6 |
| 7 |   |   |   |   |   |   |   |   | 7 |
| 8 |   |   |   |   |   |   |   |   | 8 |

FIG. 13

| QUANTIZATION STEP SIZE | EFFECTIVE ACTIVITY IN 8 X 8 CODING AREA | EFFECTIVE ACTIVITY IN CODING AREA OF 63-56 | ... | EFFECTIVE ACTIVITY IN CODING AREA OF 2 |
|---|---|---|---|---|
| 2 | 0 ~ A | 0 ~ A' | ... | 0 ~ A'' |
| 4 | A ~ B | A' ~ B' | ... | A'' ~ B'' |
| 6 | B ~ C | B' ~ C' | ... | B'' ~ C'' |
| 8 | C ~ D | C' ~ D' | ... | C'' ~ D'' |
| ..... | ..... | ..... | ..... | ..... |
| 62 | MORE THAN VALUE E | MORE THAN VALUE E' | ..... | MORE THAN VALUE E'' |

IMAGE SIGNAL CODING SYSTEM

BACKGROUND OF THE INVENTION

1. Field of the Invention

The present invention relates to an image signal coding system for coding analog image signals into digital signals in a high-definition digital video tape recorder(D-VTR).

2. Description of the Related Art

With the recent development in computers, semiconductor devices and digital signal processing techniques, developments have also occurred with respect to a conversion of analog image signals to digital signals and a storage and/or transmission technique for the digital converted signals.

In a case where analog image signals for a component television are converted into digital signals which in turn, are stored in a storage medium or transmitted through a signal transmitted channel, an amount of digital signal data to be processed is increased as compared with analog signal data.

When viewed, a limit in storage capacity of the storage medium and an effective practical use of the transmitting channel as well as a transmission of the image signal at a predetermined bit rate, a process of compressing the image signal is necessarily required.

In such an image compression, when the image signal data is reduced to a predetermined amount of digital data, an original signal information must be substantially expressed, and an error which is liable to be produced in the data storage medium has to have a steady characteristic. In addition, hardware for such an image signal compressing process must be easily constructed.

In accordance with a principle of such an image signal band compression, the image signals are subjected to a prediction coding or transform coding depending upon a correlation therebetween, and then quantized to produce the quantized factors. These factors can be produced by way of an information theory by which redundant data is minimized by using a statistical property of the image signal. The factors are then subjected to a variable length coding.

An image coding using a so-called discrete cosine transform has an advantage in that image signal energies are substantially concentrated in a lower frequency area to the digital-converted image signal and, hence, such image data can be sufficiently expressed by a small quantity of data when the lower frequency area is effectively coded.

The variable coding technique is defined such that a variable codeword is assigned to the given data to be converted on the basis of a probability density of the image data. The variable coding technique is preferably employed when the data to be processed lie to and for the image signal. Therefore, such image data unevenly distributed may be effectively expressed by way of the discrete cosine transform previously mentioned.

With such conventional coding methods which refer to only local character of the image to be processed, however, when the image signal is necessarily compressed to a target amount of data having a fixed length in, for example, the D-VTR, and the compressed image data is then stored in a storage medium or transmitted to a destination particularly when a composite image signal having variable portions and linear portion is presented therein, a redundancy generating characteristic is insufficiently considered and, thus, a serious deterioration in picture quality is likely to occur when the linear portions lie adjacent to the variable portions.

In a case where the image signal is subjected to the variable length coding, it is preferred that an amount of data per unit of time is substantially constant so as to store or transmit the coded image signal properly. For this reason, a buffer, which is controlled as a forward buffer control or backward buffer control, is employed with the image signal coding to adjust a quantization step size and, thus, to control the amount of the data to be produced during the image signal coding.

According to such a forward buffer control, an error in the storage medium is advantageously transmitted within a unit of a given fixed length, but it is difficult to precisely coincide the amount of data generated with a target amount of data.

In a case of the backward buffer control, a status of the buffer is checked for a constant period of time with regard to the quantization step size in accordance with a degree of fullness of the buffer, so that the amount of the data to be stored or transmitted can be preferably coincided with the target amount of data. However, if the variable portions of the image signal lie adjacent to the linear portions, a block effect is likely to occur due to an error which is produced in quantizing the image signal.

Further, when the D-VTR must transmit a target amount of data within a unit of limited fixed length to achieve special playback such as a high speed or fast playback, if the amount of the coded data produced exceeds a target amount of data, then it is necessary to employ hardware having a complex construction to remove such excessive factors.

SUMMARY OF THE INVENTION

Accordingly, an object of the present invention is to provide an image signal coding system in which image signals are coded and quantized adaptively to a character thereof, thereby minimizing noises that occurred during quantizing of the image signal in a band compression and improving restitution of the coded image signal.

To achieve the above object, according to the present invention, there is provided an image signal coding system which includes a scrambling means for rearranging image data of a frame formated in the order of a vertical subsampling line into a predetermined unit of blocks to distribute the highly variable portions and substantially linear portions in the image data uniformly; an activity calculation means for calculating a horizontal projection sum and a vertical projection sum of discrete coding transform factors in a unit block and a block activity, respectively, to determine a coding area and a quantization step size; an adaptive scanning means for adaptively scanning the quantized data in accordance with the coding area determined by the activity calculation means; and, a sequential transmission means for sequentially transmitting the data coded by a variable length coding in conforming with a predetermined transmitting bit rate in a unit of a fixed length; wherein a block having an underflow produced therein is added with 0 and transferred, while a block having an overflow produced therein is transmitted with only an amount of data coincided with the transfer bit rate.

According to a preferred embodiment of the present invention, the activity calculation means includes a pseudo quanitization means for quantizing the discrete coding transform factors of a unit block in conforming with the quantization step size, and a secondary coding area deciding means for deciding an initial area of which the horizontal and vertical projection sums calculated from a high-frequency region of the data quantized through the pseudo quantization are not 0.

With the activity calculation means according to another feature of the present invention, the quantization step size of the high-frequency region is set relatively larger than that of a low-frequency region of the image data.

According to still another feature of the present invention, when a transverse length of the coding area is longer than a longitudinal length thereof, the adaptive scanning means scans the coding area along a vertical direction. Alternatively, when the transverse length is shorter than the longitudinal length, the adaptive scanning means scans the coding area in a horizontal direction.

In still another feature of the present invention, the adaptive scanning means scans the coding area in the order of scanning determined on the basis of the statistical value of an actual image.

According to another preferred feature of the present invention, the activity calculation means determine the quantization step size with a format of an even number or odd number.

According to still another feature of the present invention, the sequential transmission means extracts and transmits a predetermined amount of data from a given number of data blocks forming one-frame of the image in regular order.

The above and other objects, features and advantages of the present invention will be apparent from the following description taken in connection with the accompanying drawings.

DESCRIPTION OF THE PREFERRED EMBODIMENT(S)

The present invention will be described in detail with reference to the accompanying drawings.

Figure 1:
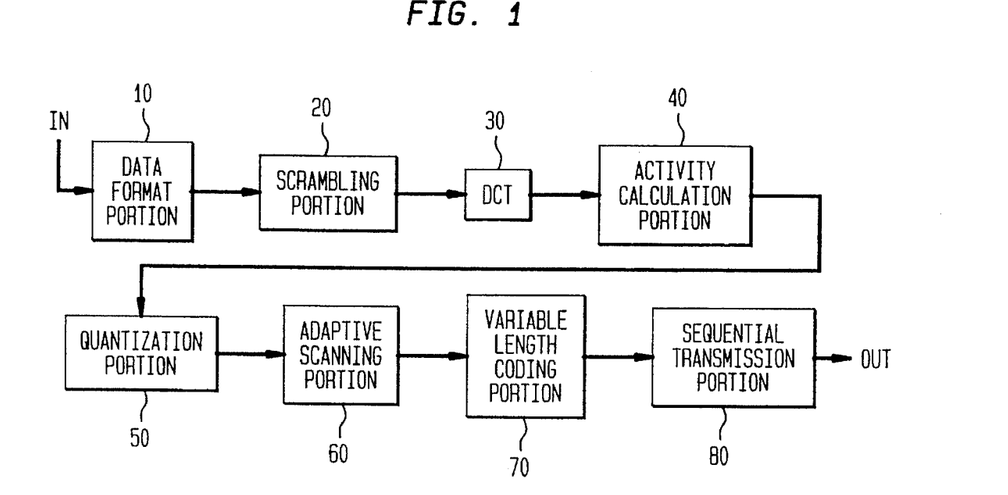
FIG. 1 is a block diagram showing an embodiment of an image signal coding system according to the present invention.

Referring to FIG. 1 showing a block diagram of a preferred embodiment according to the present invention, reference numeral 10 denotes a data format portion, 20 denotes a scrambling portion, 30 denotes a discrete coding transform (DCT) portion, 40 denotes an activity calculation portion, 50 denotes a quanitization portion, 60 denotes an adaptive scanning portion, 70 denotes a variable length code generating portion and 80 denotes a sequential transmission portion, of all which will be described later in more detail, respectively.

Figure 2A:
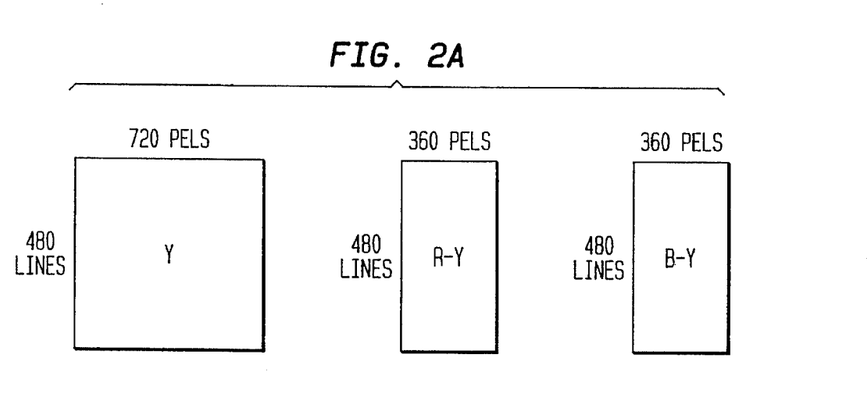
FIGS. 2(a) and (b) are views showing data formats of image data signals of a frame before and after the data format portion shown in FIG. 1.
Figure 2B:
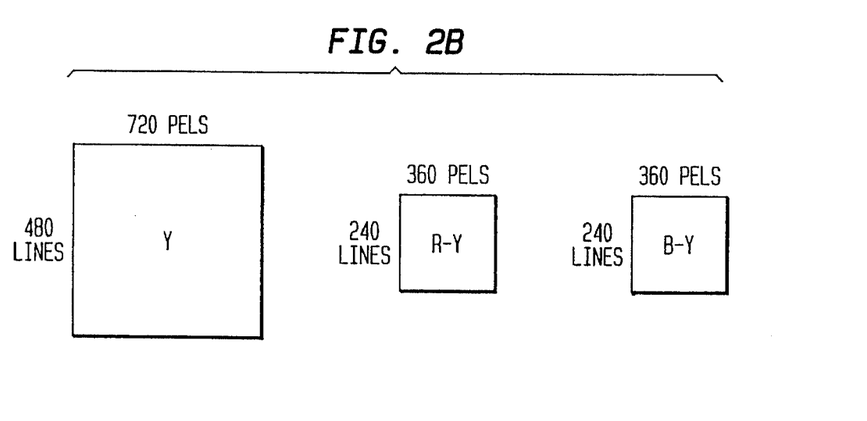

FIG. 2 is a view illustrating a signal format to be processed by the data format portion 10, in which FIG. 2(a) is a view showing a data format after 1-frame image signals for a component television are converted into digital signals. As seen from FIG. 2(a), a brightness signal Y to color difference signals R-Y and B-Y are set to a ratio of 4:2:2 (i.e., Y: 720 pel (pixels)×480 lines, R-Y: 360 pels×480 lines, B-Y: 360 pels×480 lines). This format of image signal is then transformed into a signal format as shown in FIG. 2(b). In other words, the data format portion 10 transforms the image data signal in order of vertical subsampling line by means of a pre-filter (not shown) in such a manner that the image signal having a ratio of 4:2:2 of the brightness signal to the color difference signals is converted to a signal having a ratio of 4:2:0 of the brightness signal and the color difference signals.

Figure 3A:
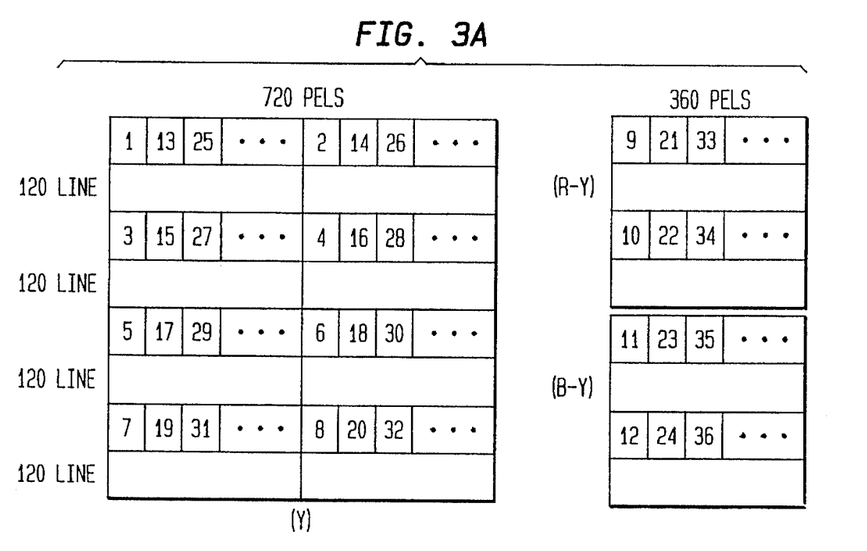
FIGS. 3(a) and (b) are views illustrating a principle of scrambling applied to the present invention.
Figure 3B:
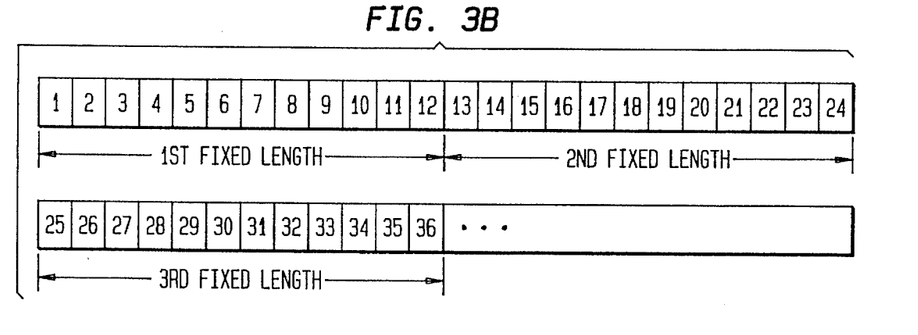

Referring to FIGS. 3(a) and (b), a principle of the image data signal scrambling effected by the scrambling portion is illustrated. In general, when viewed in a character of the image, this is classified to variable portions where values of the data forming the image are severely varied and linear portions where values of the data are substantially equal. Normally, an ordinary image has a pattern where the linear portions are adjacent to each other while the variable portions are adjacent to each other. By this reason, if the image is coded without any scrambling process, then picture quality is severely deteriorated when the data of a fixed length having the variable portions concentrated therein is coded. Accordingly, the scrambling portion 20 serves to rearrange the image data forming one-frame in a unit of blocks so as to distribute the variable portions and the linear portions in the image data uniformly. As a result, not only is data transfer efficiency within a fixed length improved, but also deterioration in picture quality is minimized.

According to the present invention, the brightness signal is scrambled in a unit of eight blocks and the color difference signals are scambled in a unit of two blocks, as shown in FIG. 3(a).

The discrete coding transform (DCT) 30 effects a two-dimensional discrete cosine transform coding in a predetermined unit of blocks (for example, 8×89 or 16 ×16 blocks). In fact, human vision is sensitive to a simple image rather than a complicated image and, hence, the present invention contemplates a quantization of the image data in such a way that the quantization step size of such a simple image becomes smaller, while that of a complicated image becomes larger.

Figure 4:
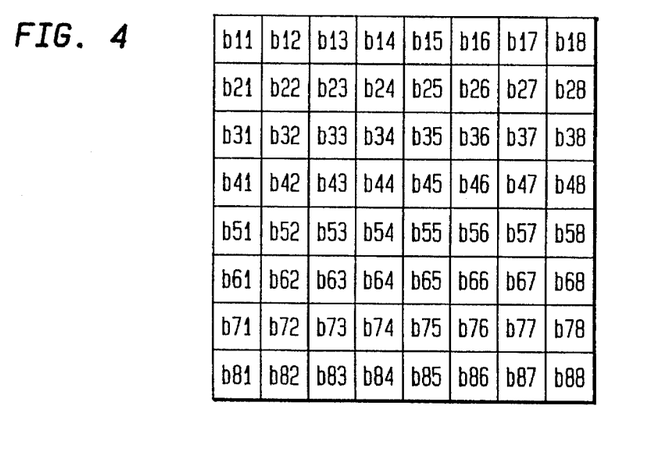
FIG. 4 is a view showing the discrete coding transform factors formed in a matrix array.
Figure 5:
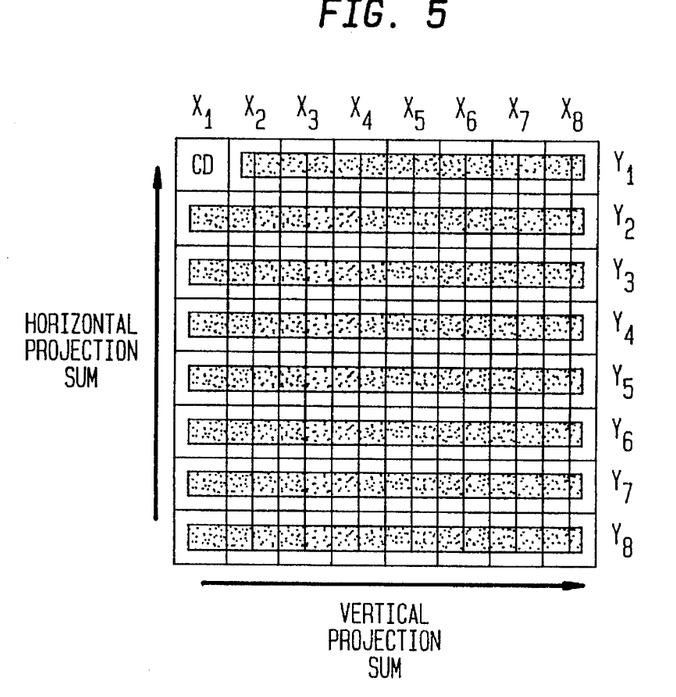
FIG. 5 is a view illustrating a principle of projection sum calculation according to the present invention.

The activity calculation portion 40 calculates horizontal and vertical projection sums (see FIG. 5) in two-dimensional discrete coding transform factors of an 8×8 matrix and then produces activity all the blocks to calculate a degree of complexity of the image, as shown in FIG. 4. Consequently, a coding area is decided by using the projection sums to encode the quantized data, and the quantization step size is also determined on the basis of the activity and the coding area decided as described above. The activity of an AC component (i.e., a portion excluding a DC component $b_{11}$ in the matrix of FIG. 4) in the discrete factors can be calculated by the following equation:

$$\text{block activity} = \sum_{i=1}^{8} \sum_{j=1}^{8} [lb_{ij} - b_{11}l] \quad (1)$$

Also, the projection sum can be calculated by the following equation.

$$\text{horizontal projection sum } xi = \sum_{j=1}^{8} lb_{ij}l \text{ (where, excluding } b_{11}) \quad (2)$$

$$\text{vertical projection sum } yi = \sum_{j=1}^{8} lb_{ij}l \text{ (where, excluding } b_{11}) \quad (3)$$

By applying the equation (2) and (3) above, the horizontal and vertical projection sums in the discrete coding transform factor matrix are effectively calculated and an area having the activity of 90% is decided as the coding area to be coded.

Figure 6A:
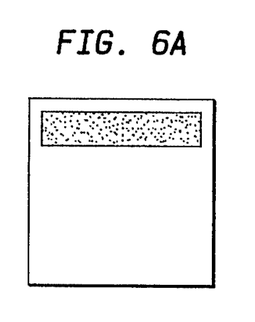
FIGS. 6(a), (b) and (c) show the discrete coding transform distributed depending upon a character of the image signal.
Figure 6B:
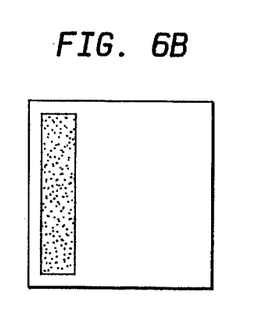
Figure 6C:
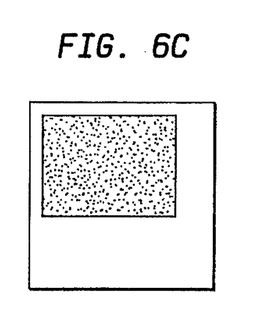
Figure 7:
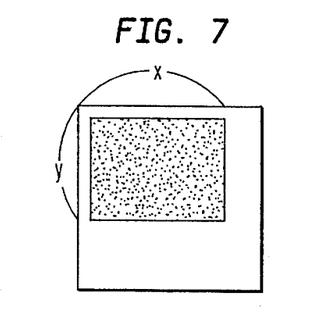
FIG. 7 is a view showing an example of a coding area of the image.

According to this embodiment, the image can be distinguished depending upon the coding area and activity, as shown in FIG, 6, in which FIGS. 6(a) and (b) denote the image data of the block having a large activity and a small coding area as well as edges generated in horizontal and vertical directions, and FIG. 6(c) denotes the image having a large coding area and a higher activity, wherein a somewhat high-frequency component is contained in the lower-frequency component. As shown from these drawings, the image having a coding area and a higher activity has the lower-frequency component presented therein.

Moreover, human eyesight is sensitive to the lower-frequency image and the edged image. Thus, the edged image and the lower-frequency image are preferably quantized by means of the quantization portion 50 with the quantization step size reduced to achieve a substantial coding, while the higher frequency image is quantized by the quantization portion 50 with the quantization step changed depending upon the activity.

Figure 8:
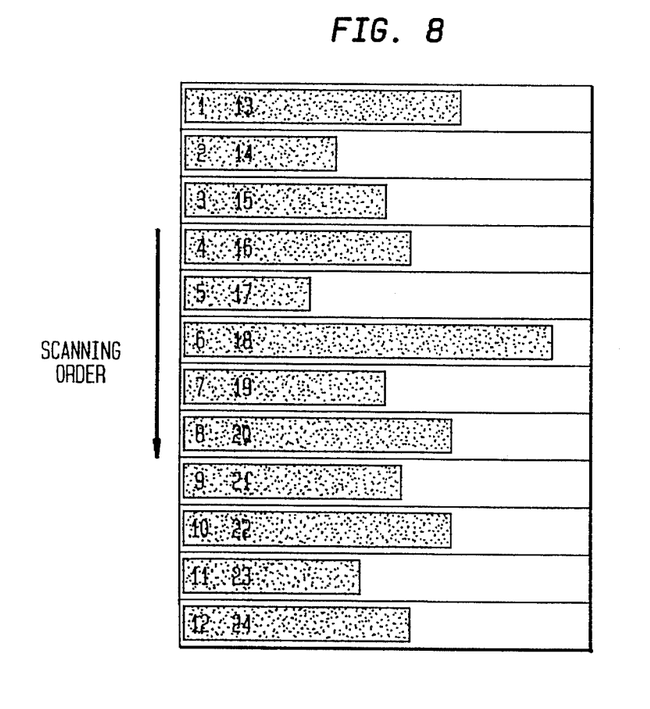
FIG. 8 is a view illustrating a sequential transmitting order of the data blocks according to the present invention.

Referring again to FIG. 1, the adaptive scanning portion 60 decides the quantized data scanning order in correspondence with the character of the coding area so as to transmit the data of the lower frequency area earlier than the data of the higher frequency area when the amount of the data produced within the fixed length exceeds a given transfer bit rate. The variable length code generating portion 70 effects a variable length coding with respect to twelve data blocks provided from the adaptive scanning portion 60, and the sequential transmission portion 80 transmits the twelve variable length coded data blocks in order shown in FIG. 8. More particularly, the sequential transmission portion 80 transmits not the data of the corresponding block in the data of the block to be transmitted (i.e., a portion hatched) and, thereafter, the data of next block but a predetermined amount of data from each of twelve blocks forming one-frame in order. When, in this transmission operation, underflow occurs in the data block to be transmitted, the block is added with "0" to be coincided with the transmission bit rate. Alternatively, an overflow occurs in the data block to be transmitted, and only an amount of the data coincided with the bit rate is transmitted. Accordingly, a feedback control is unnecessary even if the overflow occurs during the transmission of the data blocks, and thus, hardware system can be also reduced in size.

Figure 9:
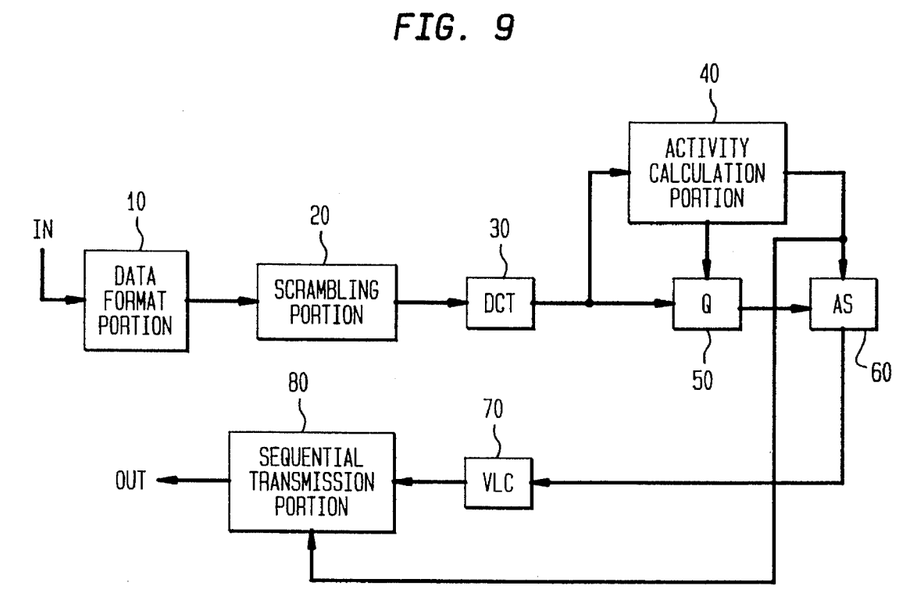
FIG. 9 is a block diagram showing another embodiment of an image signal coding system according to the present invention.

FIG. 9 shows a block diagram of another embodiment of the present invention. As seen from the drawing, this embodiment is substantially similar to the embodiment previously mentioned, excluding the difference that the coding area is decided through two steps and thus, the differential adaptive scanning is effected to the coding area.

The description of the embodiment shown in FIG. 9 will be made in detail with reference also to FIG. 10.

Figure 10:
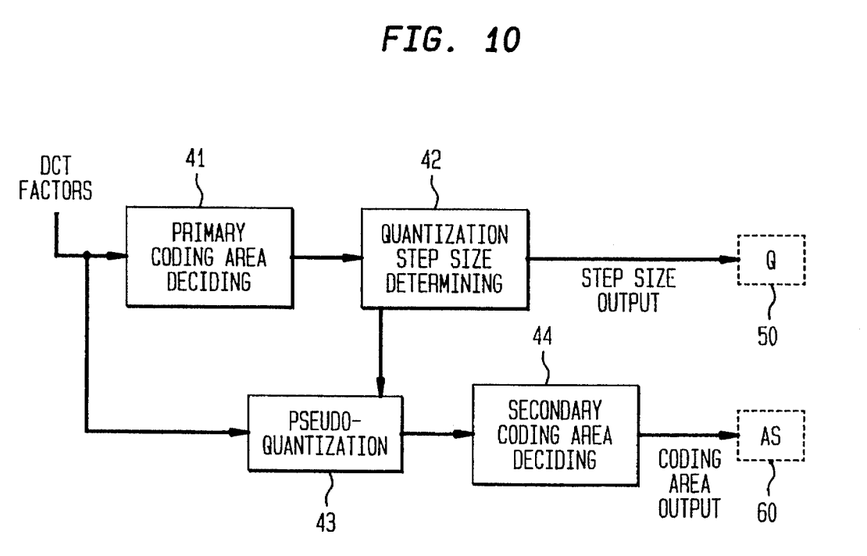
FIG. 10 is a block diagram showing a construction of an activity calculation portion according to another embodiment of the present invention.

Referring to FIG. 10 showing a detailed block diagram of an activity calculation portion 40' in FIG. 9, reference numberal 41 denotes a primary coding area deciding portion, 42 denotes a quanitization step size determining portion, 43 denotes a pseudo quantization portion which quantizes discrete coding transforms factors in accordance with the quantization step size determined so as to decide a secondary coding area, and 44 denotes a secondary coding area deciding portion, which will be described later.

As described above, human eyesight is sensitive to a simple image rather than a complicated image. Therefore, the primary coding area deciding portion 41 firstly calculates a block activity and horizontal and vertical projection sums from the discrete coding transform factors by using the equations (1), (2) and (3) so as to calculate a degree of complexity of the image.

According to this embodiment, an area having the horizontal projection sum ($X_i$) and the vertical projection sum ($Y_i$) which take approximately 90 to 98% of the block activity BA is decided as the primary coding area. That is, horizontal coding area: a mininum value of i satisfying the equation (4):

$$\alpha XBA \leq \sum_{j=1}^{i} lX_jl \quad (4)$$

vertical coding area: a minimum value of j satisfying the equation (5):

$$\alpha XBA \geq \sum_{i=1}^{j} lY_jl \quad (5)$$

where, $\alpha=0.90-0.98$, BA is the block activity, $X_i$ is the horizontal projection sum and $Y_i$ is the vertical projection.

Figure 11:
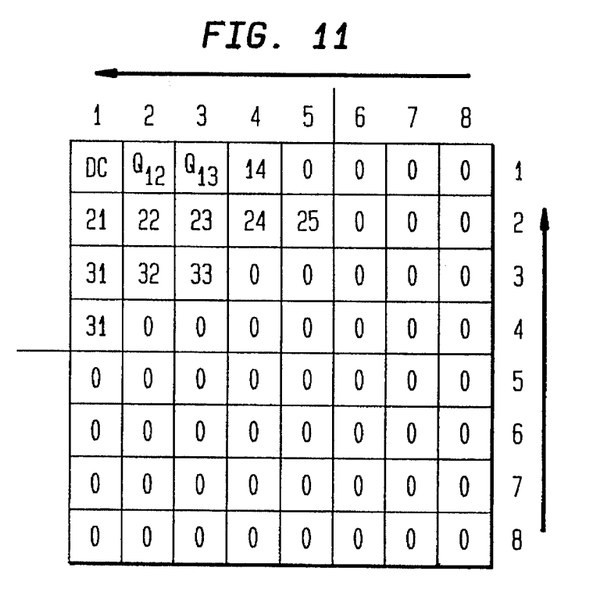
FIG. 11 is a view illustrating an example of the coding area decision according to the present invention.

FIG. 11 illustrates an example of the coding area decision according to this embodiment. In the drawing, it is to be understood that the horizontal coding area is set to 5 and the vertical coding area is set to 4.

The quantization step size determining portion 42—using the following equation (6)—obtains effective activity of an AC component of the discrete coding transform factors in the horizontal and vertical coding area determined by the primary coding area deciding portion 41 using the equations (4) and (5).

$$\text{effective activity} = \sum_{m=1}^{i} \sum_{n=1}^{j} (lb_{mn}l - lb_{11}l) \quad (6)$$

Figure 13:
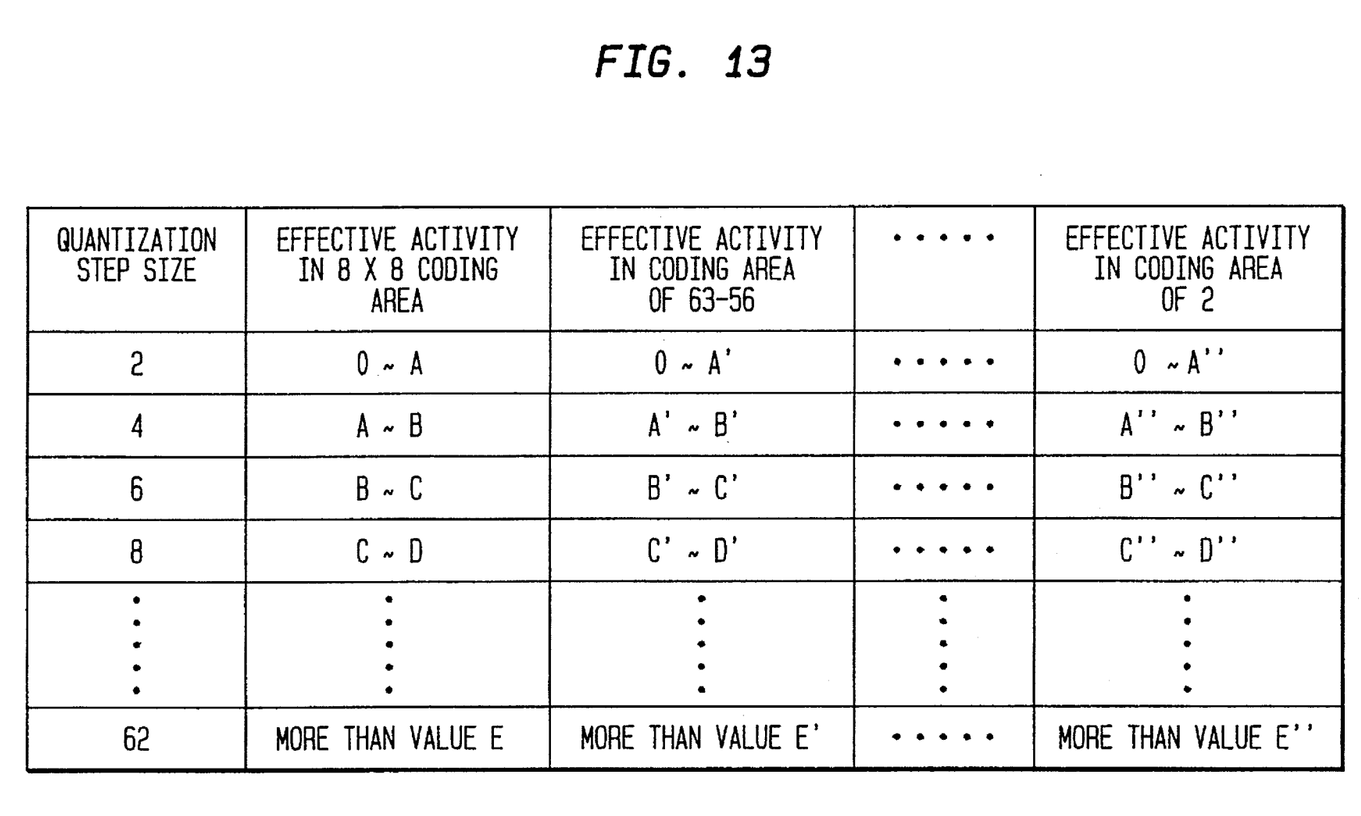

After the effective activity has been obtained as noted above, the quantization step size coding portion 42 thus determines the quantization step size in accordance with the magnitude and effective activity of the coding area in such a manner as shown in FIG. 13.

Referring to FIG. 13, if the magnitude of the coding area (i.e., horizontal coding area X vertical coding area) is 64 and the effective activity is less than a predetermined value A, then the quantization step size is set to '2'. Also, if the magnitude of the coding area is 56~63 and the effective activity is within a range between values A' and B', then the quantization step size is set to "4".

In accordance with this embodiment, the quantization step size takes even-numbered values (or odd-numbered values) to reduce the procedure steps in the variable length coding to be successively effected, thereby improving a data processing efficiency of the system.

The pseudo-quantization portion 43 quantizes the discrete coding transform factors in conforming with the quantization step size previously determined so as to decide the secondary coding area. Such a quantization can be effected as follows. That is:

$$\text{quantization data } QAC_{ij} = b_{ij}/Qss \tag{7}$$

where,

Qss denotes the quantization step size, $QAC_{ij+1}$, if $QAC_{ij} > 0$ and $QAC_{ij}$ is an odd number, and $QAC_{ij} = 0$, if $QAC_{ij} > 0$ and $QAC_{ij}$ is an odd number.

The secondary coding area deciding portion 44 calculates the porojection sums from the horizontal and vartical higher frequency components of the discrete coding transform factors in a direction indicated by an arrow in FIG. 11 and then decides the initial area of which the values of the projection sums are not "0" as the secondary coding area.

According to this embodiment, the quantization step size is decided in consideration of the complexity of the image. This causes the size of the hardware to be reduced as compared with the quantization step size determination method of the conventional forward or backward buffer control. In addition, the coding area is decided in accordance with the distribution in energy of the image, so that the amount of the redundant data can be decreased considerably.

Figure 12A:
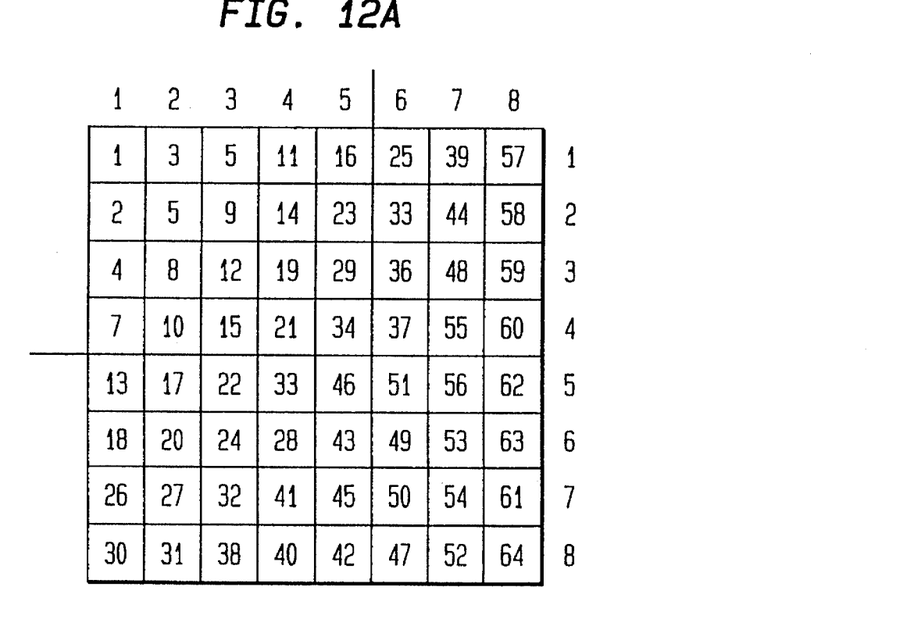
FIG. 12(a) is a view illustrating the adaptive block scanning order according to another embodiment of the present invention.
Figure 12B:
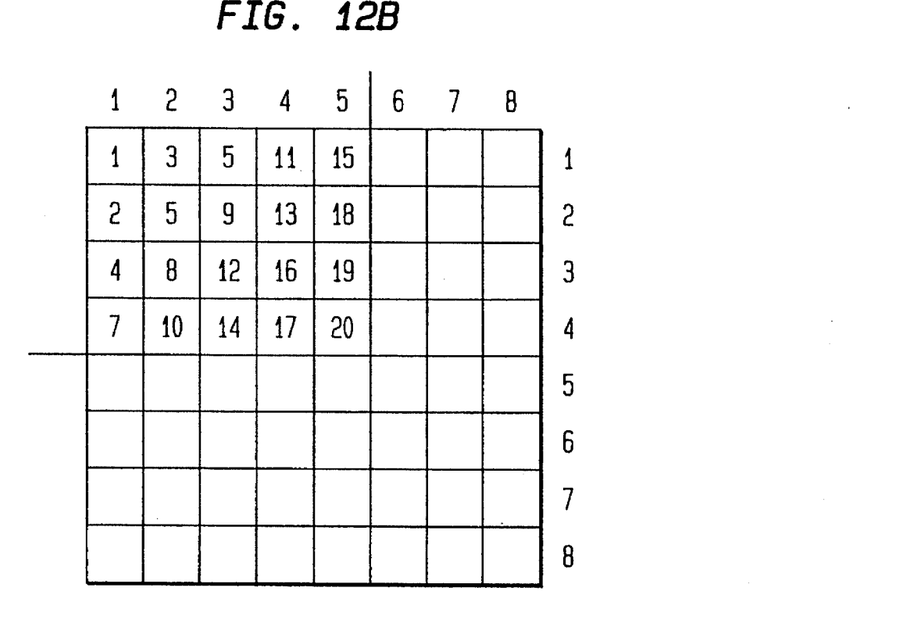
FIG. 12(b) is a view illustrating the adaptive scanning order of the coding area shown in FIG. 10; and, FIG. 13 is a table showing quantization step size determined according to the embodiments of the present invention.

FIG. 12 includes views illustrating an adaptive scanning method according to this embodiment, wherein FIG. 12(a) illustrates an adaptive scanning order for an 8×8 block area and FIG. 12(b) illustrates, when the horizontal coding area is 5 and the vertical coding area is 4 as mentioned above, a sequential adaptive scanning order for 5×4 coding area from 1 to 20 in accordance with the priority of the scanning order, as shown in FIG. 12(a).

A known horizontal scanning, a vertical scanning or a zigzag scanning is employed as the adaptive scanning manner, and there is often the result that the data of the block in any direction may be lost.

This situation can be avoided by the adaptive scanning effected in the scanning order according to this embodiment which is determined on the basis of the statistical value of the actual image.

Furthermore, the adaptive scanning manner of this embodiment satisfactorily reflects the character of the image in the coding area, so that the amount of data produced in effecting the variable length coding can be reduced.

As noted, the present invention can provide the following effects. Firstly, since the variable and linear portions of the image area are rearranged in a unit of a fixed length by applying the scrambling process without employing additional data, the redundant data of the linear portions can be provided to the variable portions, thereby increasing coding efficiency. Secondly, the quantization step size and the coding area can be decided in consideration of a degree of complexity of the so that the hardware of the system can be reduced in size and the redundant data also reduced. Thirdly, the adaptive scanning proper to the coding area is employed to produce a lot of a run of zero (i.e., in a manner that a lot of a run of zero is successive), thereby improving coding efficiency. Finally, a given amount of the data of the respective blocks can be successively extracted and transmitted in such a way that each of the block data can be transmitted evenly. As a result, data transmitting efficiency can be further increased and the hardware for removal of the transform factors can be reduced in size.

Although the present invention has been described with respect to the specified embodiments, it will be understood that various changes and modifications made therein will not depart from the spirit and scope of the present invention.

What is claimed is:

1. An image signal coding system for coding image signals for a component television which are converted into digital signals, comprising:

a data format portion for formatting a ratio of a brightness signal and color difference signals of the image signal in a vertical subsampling line order of 4:2:0.

a scrambling means for constructing image data formatted in an order of vertical subsampling line supplied from the data format portion into a predetermined unit of blocks by extracting pixels between flat portions and variable portions thereof, and coding video data for one frame of reconstructed data to distribute a highly variable portion and substantially linear portion in the image data uniformly;

a discrete coding transform portion for coding an output from said scrambling means in a predetermined unit of blocks by using a two dimensional discrete cosine transform coding;

an activity calculation means for calculating an activity value of the blocks supplied from the discrete coding transform portion to determine a coding area and a quantization step size adaptive to the distribution of frequency for the image data and a scanning pattern of the blocks in accordance with a degree of complexity of the image signal to improve coding efficiency;

an adaptive scanning means for adaptively scanning a quantized data field in accordance with the coding area determined by the activity calculation means;

an adaptive scanning portion for adaptively scanning the quantized data field in conforming with a coding determined by the activity calculation means;

a variable length coding portion for calculating an amount of data produced by applying a variable length coding to an output of the adaptive scanning portion; and a sequential transmission for sequentially transmitting the data coded by a variable length coding in conforming with a predetermined transmitting bit rate in a unit of a fixed length;

wherein a block having an underflow produced therein is added with 0 and transferred, while a block having an overflow produced therein is transmitted with an amount of data coincided with the transmitting bit rate.

2. An image coding system according to claim 1, wherein the activity calculation means comprises:

a primary coding area deciding portion for obtaining a block activity, and a horizontal and vertical projection sum for deciding an area having the horizontal and vertical projection sums corresponding to a predetermined ratio of the block activity as a primary coding area;

a quantization step size determining portion for determining portion the quantization step size on the basis of the output of the primary coding area deciding portion;

a pseudo-quantization means for quantizing discrete coding transform factors of a unit block conforming with the quantization step size; and a secondary coding area deciding means for deciding an initial area of which the horizontal and vertical projection sums calculated from a high-frequency region of the data quantized through the pseudo-quantization are not 0.

3. An image coding system according to claim 1 or 2, wherein the activity calculation means sets the quantization step size of a high frequency region to be larger than that of a low frequency region of the image data.

4. An image coding system according to claim 1, wherein the adaptive scanning portion serves to scan in such a way that when a transverse length of the coding area is longer that a longitudinal length thereof, the adaptive scanning means scans the coding area along a vertical direction, wherein when the transverse length is shorter than the longitudinal length, the adaptive scanning means scans the coding area in a horizontal direction.

5. An image signal coding system according to claims 1 or 4, wherein the adaptive scanning means scans the coding area in the order of scanning determined on the basis of a statistical value of an actual image.

6. An image signal coding system according to claim 1 or 2, wherein the activity calculation means determines the quantization step size with a format of an even number of odd number.

* * * * *